March 14, 1967

F. H. JENSEN 3,309,486

LINKAGE TYPE SWITCH CONTROL FOR
TEMPERATURE RESPONSIVE MEANS

Filed June 10, 1964

INVENTOR.
FRED H. JENSEN

BY
Robert W. Beach

ATTORNEY

INVENTOR.
FRED H. JENSEN
BY
Robert W. Beach
ATTORNEY

F. H. JENSEN 3,309,486

LINKAGE TYPE SWITCH CONTROL FOR TEMPERATURE RESPONSIVE MEANS

Filed June 10, 1964

INVENTOR.
FRED H. JENSEN

BY *Robert W. Beach*

ATTORNEY 3,309,486
LINKAGE TYPE SWITCH CONTROL FOR TEMPERATURE RESPONSIVE MEANS
Fred H. Jensen, 6849 32nd NE., Seattle, Wash. 98115
Filed June 10, 1964, Ser. No. 373,930
8 Claims. (Cl. 200—122)

This invention relates to control switch mechanism of a type in which the action of a switch actuator, which may be responsive to a controlled phenomenon, is modified to improve the accuracy of the control operation performed by the switch mechanism.

Switch mechanism has been used extensively for controlling a particular phenomenon, such as the temperature of a space or object to be heated or cooled. The heating or cooling mechanism has been energized intermittently by switch mechanism. Such switch mechanism may be operated by an actuator responsive to the temperature of the space or object being heated or cooled. The principal difficulty which has been experienced with such intermittently energized installations is the slow response of the switch means to a change in the control mechanism or in the condition of the controlled phenomenon. For that reason, where the temperature of a space or an object is to be increased or decreased by heating or cooling mechanism, it has been difficult to establish and maintain a particular desired temperature with minimum variation.

While the modified switching mechanism of the present invention could be used in installations of various types, its principal operation can be illustrated by its application in mechanism for controlling a circuit energizable to effect operation of a device for heating fluid, the temperature of which is sensed by thermoresponsive means which control a switch actuator.

A principal object of the modified switch mechanism is to control energization of such a heating device, for example, so that a desired temperature can be maintained within very close limits.

Another object is to provide such modified switching mechanism which will effect stabilization of a particular controlled temperature quickly after the temperature of the medium has been raised to the desired value or after the desired value has been altered either upward or downward from a previously set desired value.

A further object is to provide modified switching mechanism having such capabilities which is relatively simple and inexpensive and which can be substituted for a conventional switch.

An additional object is to provide such modified switch mechanism which is very compact and will occupy very little greater space than conventional switch mechanism.

It is an object to be able to apply the modifying features of the present invention to switch mechanism of different conventional types with a minimum of structural alteration in such conventional switch mechanism.

More specifically, it is an object of this invention to modify conventional switching mechanism so as to perform switching operations other than strictly in response to movement of an actuator responsive to changes in a phenomenon, such as temperature of the medium being controlled. Especially, it is an object to accomplish control movement of such switch mechanism before the actuating means responsive to the controlled phenomenon has been moved in response to a change in such controlled phenomenon sufficiently to effect such actuation of the switch mechanism.

It is also an object to provide suitable adjustment for a modifying feature or features of the switch mechanism so as to alter the sensitivity or effectiveness of the modifying means on the switch mechanism, and further to anticipate approach of the medium to a stabilized condition and to control the temperature-varying mechanism to deter or eliminate progress of temperature, for example, beyond a desired value.

The foregoing objects can be accomplished by incorporating in the switch mechanism thermoresponsive switch-modifying means, such as two or more bimetal strips interposed between a switch actuator and switch means which it operates to control heat-altering means acting on a medium the temperature of which is to be controlled. One or more of such bimetallic strips can be motivated to exert a modifying influence on the switch mechanism, such as by producing a force on it supplementing or opposing the force exerted by the switch actuator. Thus two parallel bimetallic strips can be engaged directly between a switch actuator and switch means to produce opposing forces when heated. Such strips can be heated intermittently so as to modify the force which would otherwise be produced by the actuator to effect movement of the switch means to reduce the amplitude of temperature variations effected by the heat-altering means. By a supplemental arrangement the switch means can be actuated earlier than they would be actuated by the modified switch actuator alone so as further to control the heating device to prevent or reduce excessive initial heating of the medium the temperature of which is to be controlled.

In this description and the drawings the invention has been portrayed as being applied to two different types of representative temperature-responsive controllers. The controller illustrated in FIGURES 1 to 4 inclusive is of the mechanical piston-driven type and the controller illustrated in FIGURES 9 to 12 inclusive is of the mercury switch type. In both instances the switch mechanism is controlled in response to changes in temperature which alter the pressure or volume of a fluid subjected to the temperature of the medium to be controlled. In these particular cases an increase in temperature and, consequently, an increase in the volume of the temperature-sensitive confined fluid of the controller, will effect a controlling operation of the switch mechanism to open a normally closed switch for deenergizing the heating mechanism.

Figure 1:
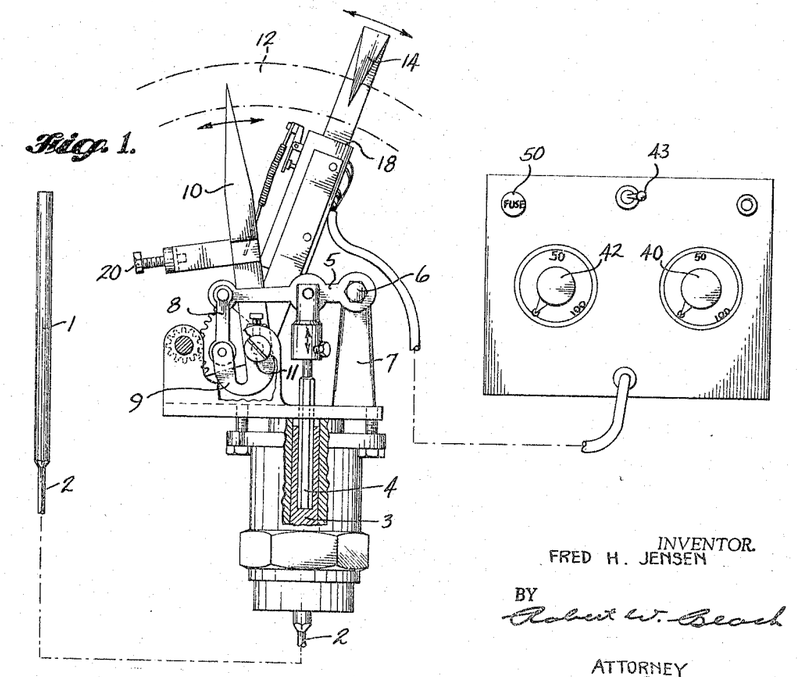
FIGURE 1 is an elevation of temperature-responsive control switch mechanism incorporating the modifying mechanism of the present invention.
Figure 2:
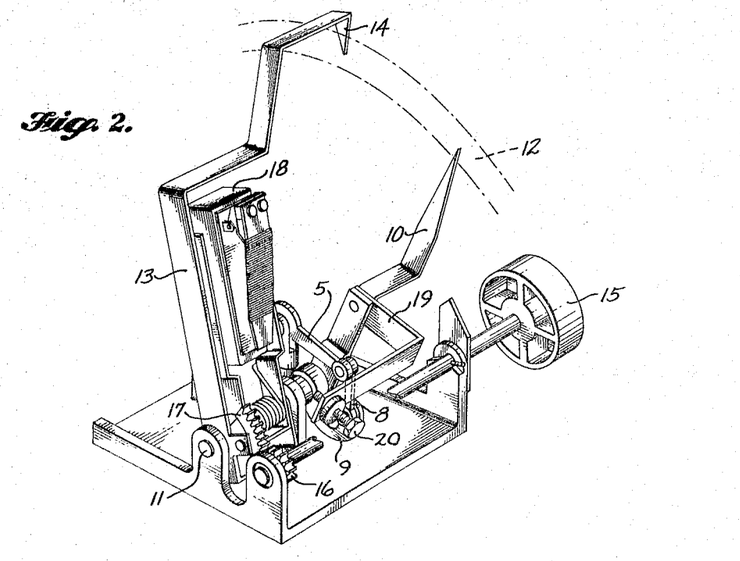
FIGURE 2 is a top perspective of one component of the same mechanism viewed from the far side of FIGURE 1.

In FIGURES 1 and 2 the temperature responsive actuator includes a temperature-sensing bulb 1 is connected by a tube 2 to a cylinder in which the piston 3 fits. As fluid in the bulb, either liquid or gas, is expanded by heat, the piston 3 will be moved upward to raise the plunger 4 seated in a cavity of the piston for swinging a lever 5 mounted by pivot 6 on post 7. The swinging end of the lever is connected by a link 8 to the horn 9 of a swingable indicating pointer 10 mounted by a pivot 11. Such pointer swings along a scale 12 to indicate the temperature of the medium sensed by the bulb 1.

On the same pivot 11 is mounted a settable selector arm 13 having a pointer 14 which can be moved along the scale 12 to indicate a particular selected temperature which it is desired to have maintained by the medium sensed. This pointer can be swung into any desired selected position by rotating a knob 15 which turns a pinion 16 meshing with a gear sector 17 which is mounted on the selector arm 13. Preferably the gear 16 is of considerably smaller radius than the gear sector 17 so that the location of the pointer 14 can be set with accuracy.

On the selector arm 13 is mounted a control switch 18. An arm 19 mounted on the indicating pointer 10 extends into a position such that its tip overlaps the control switch 18. Such arm carries an adjustable actuating member in the form of a screw 20 to engage and actuate with switch 18 as the indicating pointer 10 approaches close to the pointer 14 of the selector arm 13. The mechanism thus far described is conventional and the switch 18 ordinarily has a switch-actuating plunger which is engaged directly by the actuating screw 20 to effect operation of the switch.

Adjustment of the screw 20 toward the control switch 18 will effect opening of the switch to deenergize the medium heating device at a temperature lower than that at which the heating device would be deenergized if the screw were further retracted. Such adjustment is provided to enable the temperature of the medium maintained to match more closely the desired temperature of the medium for which the selector pointer has been set.

Where the switch 18 is simply a microswitch which controls the energization and deenergization of heating mechanism, it has been found first that in being brought up to temperature, the tendency is for the medium to be heated initially to a temperature considerably higher than that for which the selector pointer has been set before the medium begins to cool again. Next, the medium will cool to a temperature substantialy below that for which the selector pointer is set before the reenergized heating mechanism can supply such heat as to prevent such a temperature drop. Thereafter the temperature of the medium will tend to be stabilized at the temperature selected by setting of the selector pointer, but the temperature of the medium will fluctuate an appreciable amount above and below such selected temperature. In order to maintain the temperature of a medium much closer to the particular temperature selected, it has previously been necessary to employ quite complicated and expensive control mechanism.

By modifying control switch mechanism of the type described above, for example, in accordance with the present invention, it is possible to maintain the temperature of the medium much closer to the desired selected temperature. Such mechanism, in general, involves the use of thermoresponsive means to modify the action of the switch-actuator screw 20 on the switch means 18. Such thermoresponsive means is shown in FIGURES 1, 2 and 3 as including a compound lever arrangement of a plurality of bimetal levers, at least one of flexible strip which is equipped with heating means, which is interposed between the temperature-responsive actuator and the system-controlling switch means.

Figures 3, 4:
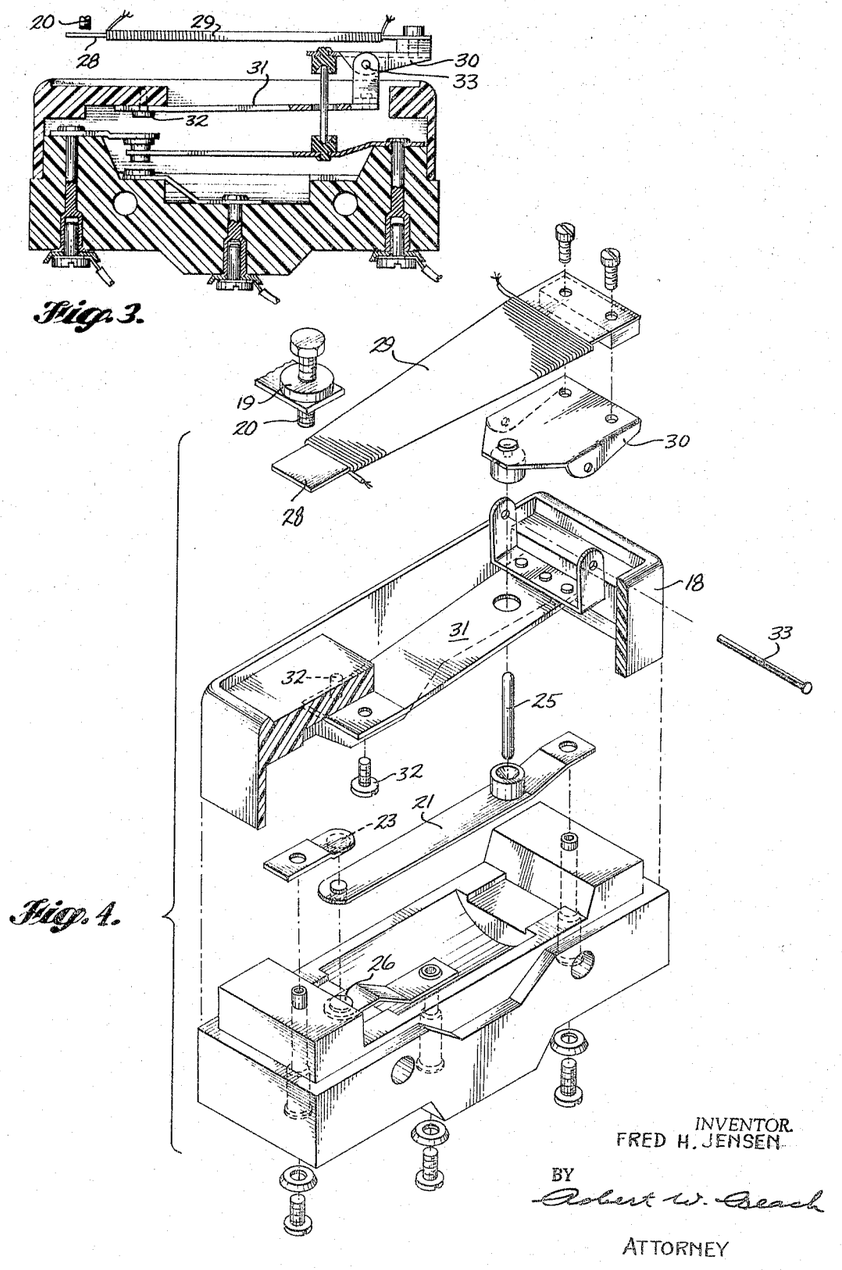
FIGURE 3 is a longitudinal central section through switch means modified in accordance with the present invention.
FIGURE 4 is an exploded top perspective of switch means incorporating modifying mechanism of this invention.

In the control mechanism of the present invention any of various types of control switches can be used and the construction of switch 18 shown in FIGURES 3 and 4 is simply representative. Such a switch should, however, be of the snap action type and may generally be designated as a microswitch. To the contact arm 21 of the switch mounted in cantilever fashion is connected a wire 22. The contacting end of the switch arm will engage a contact 23, to which a wire 24 may be connected, when the switch arm is in its normal position. When sufficient pressure is exerted on the switch arm, such as by the plunger 25, to shift the switch arm, its contacting end will engage an opposite contact 26 to which wire 27 can be connected. Thus, the switch can be connected in a control circuit either as a normally open or as a normally closed switch. The characteristics of the switch should be such that the switch arm 21 cannot dwell in an intermediate position in which the contacting end of the switch arm does not engage either contact 23 or contact 26.

In a conventional control the switch 18 would be positioned so that the screw 20 of the switch actuator would bear directly on the outer end of the switch-actuating plunger 25 so that, when sufficient pressure was exerted by the screw, the switch arm 21 would be swung from its position in engagement with contact 23 into its position in engagement with contact 26. The modifying thermoresponsive means of the present invention can most effectively be engaged between the switch-actuator screw 20 and the switch plunger 25 in the form of a compound lever arrangement of flexible bimetal strips which can be sufficiently compact as to be mounted directly on the switch 18. It will then be possible in control mechanisms of conventional type simply to substitute such switch mechanism modified in accordance with the present invention for a conventional switch installation with very minor changes, if any, in the construction of the control mechanism.

In the particular compound lever arrangement of bimetal strips shown in FIGURES 3 and 4, the position of the switch 18 is reversed end-for-end relative to the switch-actuator screw 20 so as to locate the switch plunger 25 at a location spaced lengthwise of the switch from such screw. The compound lever includes a flexible bimetallic strip 28 which can be heated by an electric resistance heating winding 29 adjacent to it, which conveniently can be wound around it. One end of this strip is located to be engaged by the switch-actuator screw 20 and the other end of the strip carries a return stub 30 overlapping a portion of the length of the strip. A second flexible bimetallic strip 31 is mounted by one end in cantilever fashion on the casing of switch 18, such as by the rivet 32 constituting a support, and the other floating end of such strip is secured by a pivot fulcrum 33 to a location between the ends of the stub 30 so that the strips 28 and 31 are disposed in generally overlapping parallel arrangement. The location of pivot fulcrum 33 on stub 30, the length of such stub and the location in which strip 31 is mounted on switch 18 are such that the switch plunger 25 will engage a portion of the stub 30 at the side of pivot fulcrum 33 remote from the connection between such stub and strip 28.

Bimetallic strips 28 and 31 will be arranged in the compound lever assembly described above so that heating of the strip 28 will tend to move the end of such strip contacted by the screw 20 toward such screw, thus increasing the pressure by the screw on switch plunger 25 and, consequently, effecting earlier movement of the switch plunger by the lever to open switch 21, 23. In other words, the bimetallic strip 28, as seen in FIGURE 3, will bow concavely upward. Heating of the other bimetallic strip 31, on the contrary, will deform this strip in a manner tending to raise the fulcrum pivot 33 so as to decrease the force of the lever system on the switch plunger 25 and facilitate closing of switch 21, 23. Heating of this strip will, therefore, cause it likewise to bend so that its upper side becomes concave. Because simultaneous heating of the bimetallic strips 28 and 31 will produce opposing forces on the switch plunger 25, the absolute change in force on this plunger effected by simultaneous heating of the two bimetallic strips to the same degree will be negligible. Consequently, changes in ambient temperature will not alter the performance of the switch mechanism.

On the contrary, if the electrical resistance heating winding 29 is energized, it will heat the bimetallic strip 28 with no appreciable effect on the temperature of the other bimetallic strip 31. Such heating of bimetallic strip 28 alone will increase the force of the lever system on the switch plunger 25. If the switch arm 21 has been displaced from its upper position shown in FIGURE 3 to its lower position by movement of the switch-actuator screw 20, therefore, cooling of strip 28 will relieve pressure on the plunger 25 to enable the switch arm 21 to be returned from its lower position to its upper position by the restoration force built into the switch tending to maintain the switch arm 21 in its upper position normally. The effectiveness of the modifying mechanism of the present invention is obtained, therefore, by controlling properly the timing and duration of the energization of resistance winding 29 for heating the bimetallic lever arm 28.

In general, the operation of the modified switch mechanism shown in FIGURES 1 to 4 inclusive is that, with the contacting end of switch arm 21 in engagement with contact 23, the heating mechanism would be energized to heat the medium, the temperature of which is sensed by the bulb 1. Assuming that the temperature indicated by the pointer 10 on scale 12 is considerably lower than that for which the selector arm pointer 14 is set, the indicating pointer 10 will gradually swing clockwise, as seen in FIGURE 1, toward pointer 14 until the actuator screw 20 engages the free end of the bimetallic strip 28. As the pointer 10 and arm 19 swing farther such engagement of the screw with the bimetallic strip will deflect such strip and increase the tilting moment on the stub portion 30 of the lever system about fulcrum 33 to tend to depress the plunger 25. Eventually this pressure will increase to the point that it will overcome the resilient resistance inherent in the contact arm leaf 21 and snap it from engagement with contact 23 into the other position of the leaf. The wires 22 and 24 would be connected in the heating mechanism control circuit so that breaking of the switch 21, 23 will deenergize the heating apparatus.

Figure 6:
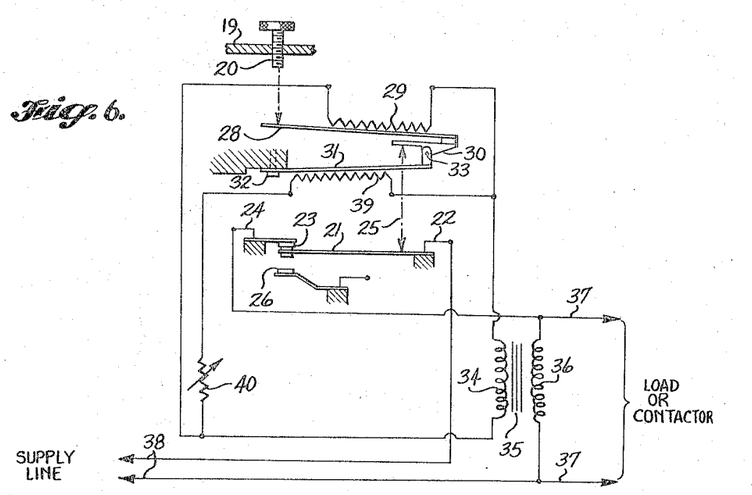

If the heating resistance winding 29 is connected in circuit with wire 24 connected to the contact 23, as shown in FIGURE 6, movement of the switch arm 21 to engage contact 23 will bring the heating resistance winding 29 into energized condition. A representative circuit which may be used for this purpose is shown in FIGURE 6 in which the winding 29 is shown as being connected to the secondary winding 34 of transformer 35. The primary winding 36 and the output lines 37 are connected to the supply line 38 through the switch 21, 23 of the control mechanism. This switch will be closed when screw 20 is out of engagement with the bimetallic strip 28. Heating of the bimetallic strip 28 by winding 29, as has been mentioned, will bend such strip in a direction tending to open switch 21, 23 and cooling of such strip will tend to relieve the pressure on plunger 25 to enable the switch 21, 23 to close. The lower the temperature of the atmosphere in which strip 28 is located the faster heat will be dissipated from it and the sooner its concave-upward flexing will be reduced to tend to enable switch 23 to close again.

Prior to movement of indicating pointer 10 toward selector arm 13 sufficiently to engage the screw 20 with the bimetallic strip 28, the heating of resistance winding 29 will effect bending of the bimetallic strip 28 so that its free end is in its closest possible position toward screw 20. As screw 20 continues to be moved in the same direction after it contacts the free end of arm 28, therefore, it will bend such arm to open switch 21, 23 in the lower portion of the control band in which the control mechanism operates. As soon as switch 21, 23 is thus opened, the supply of power to the load line 37 and to the transformer 35 will be interrupted. Simultaneously, therefore, supply of heat, both to the medium the temperature of which is to be controlled and to the bimetallic strip 28, will be terminated, but the temperature of the medium will continue to rise, because of residual heat in the heating apparatus. Bimetallic strip 28, however, will begin to cool immediately, thus relieving the pressure on plunger 25 so that switch 21, 23 will close again. Such on an off action of the switch depending on the system requirements to maintain equilibrium constitutes time proportioning.

As the temperature of the medium continues to rise, the screw 20 will move farther to bend bimetallic strip 28 for opening switch 21, 23 again, which again will deenergize both the load line and the heating winding 29. Because of such additional movement of screw 20, bimetallic strip 28 must cool farther than before in order to relieve the force on plunger 25 sufficiently to enable the switch 21, 23 to close again. The procedure continues with switch 21, 23 being alternately opened and closed because of the alternate heating and cooling action of bimetallic strip 28. As the screw 20 continues to be moved corresponding to an increase in temperature toward the desired temperature for which the selector pointer 14 is set, the periods during which switch 21, 23 is closed will decrease in length and the periods during which such switch is open will correspondingly increase in length until, when the medium has reached approximately its desired temperature on set point, the switch 21, 23 will be closed only a sufficient proportion of the time to maintain the temperature of the medium at its desired value. Such reduction in switch-closed time as the desired temperature is approached constitutes automatic reset action.

In order to provide the most effective operation of the switch means modifying apparatus for this purpose, it is desirable for such bimetallic strip to be of a construction which will enable it to be heated and to cool quite rapidly. Thus, such strip can be of material approximately .010 to .015 of an inch in thickness so that it will effect an opening and closing cycle of switch 21, 23 in approximately 15 to 30 seconds. The proportion of each cycle of the switch during which the switch is closed, or time proportioning, will depend upon the difference between the temperature of the medium as sensed by the controller and the temperature for which the controller selector pointer is set and, as mentioned above, the proportion of the cycle during which the switch is closed is reduced as such temperature difference is reduced to provide automatic reset operation. The duration of the cycle will depend upon the heating effectiveness of the winding 29 and the heating and cooling characteristics of the bimetallic strip 28.

If the temperature of the medium tends to decrease for any reason so that the indicating pointer 10 tends to move away from the bimetallic strip 28, the switch-opening force on the plunger 25 will be decreased and the portion of the cycle during which switch 21, 23 is closed will increase. In using a control circuit such as shown in FIGURE 6, it will be evident that the load line 37 can be connected to any desired type of controller for any type of temperature altering device, such as an electric resistance heater, an "on"-"off" type of oil or gas furnace or refrigerating apparatus.

While the switch-modifying mechanism shown in FIGURES 3 and 4 has been illustrated as having only one artificially heated leg, such modifying mechanism shown diagrammatically in FIGURE 6 is illustrated as having a resistance heating winding 39 for heating the bimetallic strip 31 in addition to the heating winding 29 for heating the bimetallic strip 28. It will be noted that the heating winding 39 is connected in parallel with the heating winding 29 to the secondary 34 of the power transformer 35. As has been mentioned previously, heating of the bimetallic strip 31 produces an effect opposite to the heating of bimetallic strip 28. Thus, heating of the bimetallic strip 31 bends this strip concave upwardly so as to tend to raise the pivot fulcrum 33 so as to move the return stub 30 to relieve pressure on the switch plunger 25. Conversely, cooling of the bimetallic strip 31 from a heated condition will tend to lower the fulcrum pivot 33 and increase the pressure on plunger 25 tending to break switch 21, 23. While, as has been mentioned, the heater winding 29 for bimetallic strip 28 and the heater winding 39 for bimetallic strip 31 are connected in the same circuit in parallel and produce opposite effects on the plunger 25 by heating of their respective bimetallic strips, this does not mean the heating effect is simply cancelled out. On the contrary, the characteristics of the bimetallic strip 31 selected are different from the characteristics of the bimetallic strip 28 discussed above. The bimetallic strip 31 is of considerably heavier material than the bimetallic strip 28, such as having a thickness of .040 of an inch, for example, so that it has considerably greater heat absorption and storage characteristics. Consequently, even if the heating capabilities of the windings 29 and 39 were the same, the rate of temperature increase of bimetallic strip 31 and, therefore, its bending rate would be much slower than that of bimetallic strip 28. Similarly, the straightening rate of strip 31 would be much slower than that of strip 28 resulting from cooling of the strip after deenergization of the winding 39. Also, the heating effectiveness of winding 39 may be considerably less than the heating effect of winding 29.

In addition, and especially because the lever fulcrum pivot 33 is carried by the free end of bimetallic strip 31, it is desirable for such strip to have considerable stiffness. Such stiffness is obtained, not only by the greater thickness of this strip, but also by making the strip quite wide, such as approximately one-half of an inch. Despite such greater thickness and width, however, heating of the strip still effects bending of it. The stiffness of such a strip without alteration of its thermoresponsive bending characteristics can be still further increased if two such strips are secured together in face-to-face relationship. Such greater mass will also increase the time to effect a given bending of the strip by heating it with a given resistance heating element or straightening of the strip in cooling. Straightening of the strip can be retarded further if it is insulated to deter the dissipation of heat.

When the heating apparatus is being operated to bring up to the selected controlled temperature the medium to be heated and the switch-actuator screw 20 is out of engagement with the bimetallic strip 28, both the heating windings 29 and 39 will be heated so that the bimetallic strips 28 and 31 will be bent to their maximum deflections. When the actuator screw 20 engages the end of bimetallic strip 28 with sufficient force to reciprocate plunger 25 to open switch 21, 23, such heating windings will be deenergized and both strips 28 and 31 will begin to cool. The cooling of strip 28 will progress much more rapidly than that of strip 31, however, so that the tendency of strip 28 to effect closing of switch 21, 23 will greatly exceed the tendency of strip 31 in cooling to maintain the switch 21, 23 open.

When the switch 21, 23 is again closed as a result of cooling of strip 28, the reenergized windings 29 and 39 will cause strip 28 to tend to open switch 21, 23 again, whereas the renewed heating of strip 31 by winding 39 will tend to maintain this switch closed. Such tendency to keep the switch closed, however, will be much less pronounced than the tendency of strip 28 to open the switch. Consequently, such switch will open again deenergizing windings 29 and 39 so that the two strips can cool. The intermittent energizing and deenergizing of windings 29 and 39 will continue in this fashion; but because the heating and cooling effects on strip 31 are much more sluggish than the heating and cooling of strip 28, strip 31 will gradually straighten increasingly by progressive loss of heat as the temperature of the medium increases to provide automatic reset action. The time proportioning effect of the modifying mechanism will increase correspondingly, the proportion of each on-off cycle during which the load line 37 is energized decreasing more rapidly than would be the case if bimetallic strip 31 were not artificially heated.

The controller will, therefore, cause the heating apparatus to effect heating of the medium to the exact selected temperature set by performing an effective combination of time proportioning and automatic reset operation with the simple and practical switch-modifying mechanism of FIGURE 6. In other words, the provision of an artificial heating winding 39 for the bimetallic strip 31 with greater heat-absorbing characteristics in effect anticipates the heating needs of the medium which will be required to raise the temperature of the medium to the desired value and maintain its temperature at that value.

Because the characteristics of the heating apparatus used in different installations will be different, different types of medium may be heated by different installations and the medium may vary from time to time even in a particular installation, it is desirable to enable the supplemental control effected by the artificially heated bimetallic strip 31 to be altered. As has been mentioned above, the design of the bimetallic strip 31 will establish its heating and cooling characteristics under the influence of a particular resistance heating winding 39, but the heating effectiveness of this winding can be altered at will by including in the circuit of this winding a rheostat 40 shown in FIGURE 6.

Figure 5:
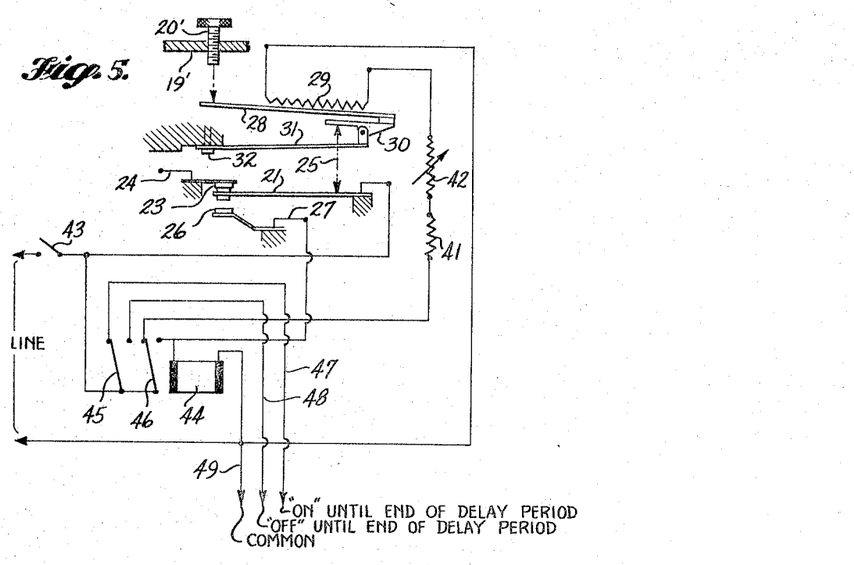
FIGURES 5, 6, 7 and 8 are diagrammatic representations of switch means modified in accordance with the present invention and representative control circuits in which such switch mechanism can be used.

The modified switch mechanism of the present invention has been shown in FIGURES 1, 2 and 6 as being embodied in a temperature-sensitive switch control mechanism. Such switch-modifying mechanism is, however, capable of being used in applications of other types. In FIGURE 5, for example, such modifying mechanism is shown as being used to effect a timing cycle after which the mechanism is automatically reset to effect a subsequent timing cycle. In this instance, an adjustable screw 20' can be provided to contact the free end of the bimetallic strip 28; but, in this instance, the mounting 19' for the screw is simply any stationary mounting. In this instance, also, heating of the bimetallic strip 28 by the heating winding 29 will effect bending of the strip concavely upward so as to increase the force on plunger 25 tending to open the switch 21, 23. The heating effect of the winding 29 can be limited by a fixed resistance 41 and adjustment of a rheostat 42 can further vary the heating effect.

The timing operation of the switch mechanism shown in FIGURE 5 can be initiated by closing of a control switch 43 and terminated by operation of a relay 44 controlling armatures 45 and 46. Armature 45 controls the circuit to be timed and armature 46, in one position, controls the switch-modifying mechanism and, in the other position, completes a holding circuit for relay coil 44. Armature 45 connects one wire 47 or another wire 48 to one side of the line, depending upon whether the relay 44 is energized or deenergized, and a further wire 49 is connected to the other side of the line. Consequently, one circuit will be completed between wire 47 and wire 49 when the armature 45 is in the position shown in FIGURE 5 and an alternative circuit will be completed between wire 48 and wire 49 when the relay is energized to swing the armature 45 into its opposite position in contact with wire 48.

When switch 43 is closed electricity will be supplied through relay armature 46, resistance 41 and rheostat 42 to the resistance heating winding 29. Heating of such winding will, in turn, heat bimetallic strip 28 so that it will be bent concavely upward and thereby produce a progressively greater force on the switch plunger 25 tending to open switch 21, 23 and close switch 21, 26. As soon as the force produced by deformation of strip 28 on plunger 25 is sufficiently great to move switch arm 21, a circuit will be completed from the line to relay coil 44 so as to energize it for swinging armatures 45 and 46 into their opposite positions. Such swinging of armature 46 will complete a holding circuit from the line to relay winding 44 and simultaneously interrupt the circuit through the heating winding 29. Swinging of armature 45 will deenergize the circuit through wire 47 and complete the circuit through wire 48.

As the bimetallic strip 28 cools the force on switch plunger 25 of the modifying lever system will be relieved to enable the switch arm 21 to move from engagement with contact 26 to engagement with contact 23 so that the modifying mechanism will be reset to effect a subsequent timing operation by reenergization of resistance heating winding 29. Opening of switch 21, 26 will not, however, deenergize relay 44 because of the completion of the circuit to the relay coil through the armature 46. Armature 45 will then maintain the circuit through wire 48 until switch 43 is opened, which will deenergize the relay coil 44 so that the armatures 45 and 46 resume their positions shown in FIGURE 5. The apparatus will thus be reset for the initiation of another timing operation that will be reclosing switch 43.

While, for use as a timer in the manner explained above, the wire 27 is connected to a relay 44, the switch-modifying apparatus shown in FIGURE 5 could be utilized for maintaining an article at a particular temperature without using temperature-sensing mechanism, as shown in FIGURES 1, 2 and 6. In this instance the wire 24 would be connected to the heating apparatus and to the primary winding 36 of a transformer 35, as shown in FIGURE 6, while the secondary winding of such transformer would be connected to the circuit including the resistance heating winding 29, the fixed resistance 41 and the rheostat 42. With apparatus of this type the artificial heating of the bimetallic strip 28 would effect intermittent opening and closing of the switch 21, 23 until the heating apparatus had heated the article to the desired temperature. At that time the rheostat 42 could be adjusted to regulate the heating effect of winding 29 on bimetallic strip 28 so that such strip would by its heating and cooling effect intermittent opening and closing of switch 21, 23 for intervals of time which would result in operation of the heating apparatus for the desired proportion of time necessary to maintain the article being heated at a constant temperature.

Figure 7:
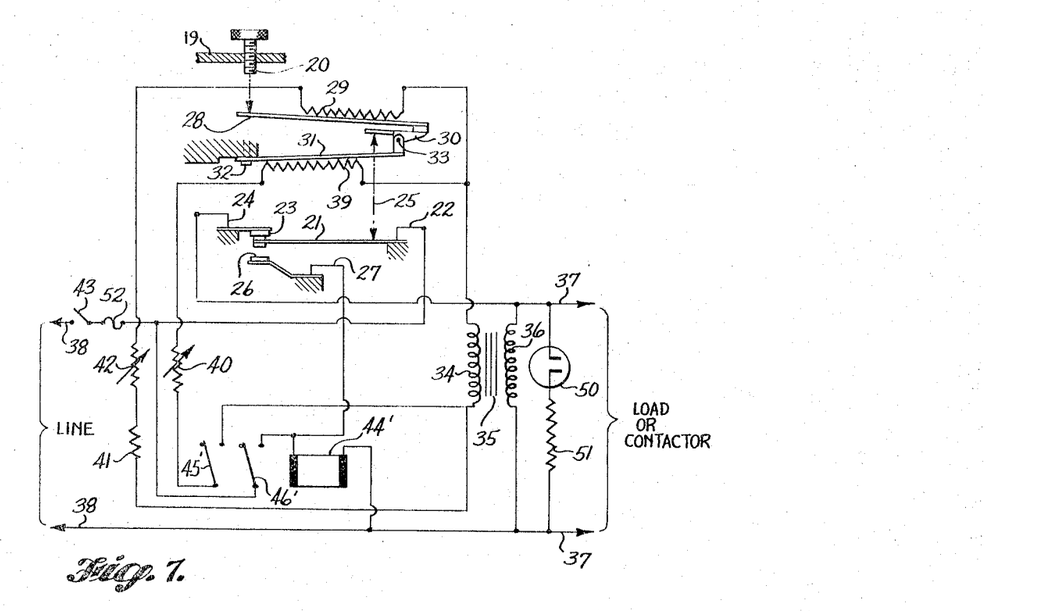

In FIGURE 7 a slightly different form of switch-modifying mechanism is shown utilized in a different circuit arrangement. The purpose of this mechanism is to prevent or minimize progress of a temperature being adjusted beyond the selected value, that is, to prevent or minimize overshoot or undershoot of temperature in bringing the temperature of the medium to the value selected. This result is accomplished by anticipating the heating needs for the medium to bring it to the desired value of temperature selected. The construction of the switch means modifying mechanism used in this embodiment of the invention is similar to that illustrated in FIGURE 6, but the circuit for the resistance heating winding 39 is different.

In this form of switch-modifying apparatus, the switch 21, 23 controls energization of the load or contactor line 37 and of the primary winding 36 of transformer 35, as described in connection with the circuit of FIGURE 6. The secondary winding 34 of this transformer is connected to the resistance heating winding 29 for bimetallic strip 28, as in FIGURE 6, and this circuit is provided with a fixed resistance 41 and a rheostat 42 adjustable to vary the heating characteristics of the winding 29, as discussed in connection with FIGURE 5. Also in this circuit contact 26 of the switch mechanism is connected by wire 27 to the relay coil 44' so that this relay will be energized when the switch arm 21 moves into engagement with contact 26. Energization of the relay coil 44' will swing armature 46' of the relay to close a relay-holding circuit so that after the first engagement of switch arm 21 with contact 26 relay coil 44' will remain energized until the manual control switch 43 is opened. The operation of such relay is, therefore, the same as discussed in connection with FIGURE 5 as to relay 44.

The circuit of FIGURE 7 differs from the circuits of FIGURES 5 and 6 in that the resistance heating winding 39 for bimetallic strip 31 is not energized at all times that the resistance heating winding 29 for bimetallic strip 28 is energized, while in the circuit of FIGURE 6 one of these windings is never energized alone. Energization of winding 39 is effected only after energization of relay coil 44' when switch arm 21 engages contact 26. In addition to closing the relay-holding circuit by moving armature 46', energization of relay coil 44' will energize winding 39 by moving armature 45' which is in the circuit connecting winding 39 to the secondary winding 34 of the transformer. Thereafter the resistance heating winding 39 will continue to be connected in parallel with the resistance heating winding 29 during further operation of the switch-modifying mechanism because, after the relay coil 44' has once been energized, its holding circuit will continue its energization throughout the remainder of the controlling operation until switch 43 is opened.

The operation of the mechanism shown in FIGURE 7 differs from that of FIGURE 5, therefore, in that, when switch-actuator screw 20 first engages the bimetallic leaf 28, it will be bent in both instances to produce the maximum tendency to open the switch 21, 23, but bimetallic strip 31 will not be producing any tendency to hold switch 21, 23 closed in the circuit of FIGURE 7, whereas in the circuit of FIGURE 6 this bimetallic strip is heated by winding 39 to bend such strip for tending to close the switch 21, 23. Heating of the bimetallic strip 31 is initiated only after screw 20 has engaged bimetallic strip 28 with sufficient force to effect opening of switch 21, 23 and closing of switch 21, 26.

When closing of switch 21, 26 energizes relay coil 44', a circuit is completed through the resistance heating winding 39 so that, when the bimetallic strip 28 has cooled sufficiently to enable switch 21, 23 to close again to energize secondary winding 34 of transformer 35, winding 39 will be energized. Each time switch 21, 23 is closed, therefore, the energization and heating of winding 39 will tend to move the fulcrum 33 to relieve the pressure of the return stub 30 on plunger 25 for facilitating closing of this switch. In order to overcome this tendency, it will be necessary for bimetallic strip 28 to cool much more than would otherwise be required, to become straighter, in order to relieve the pressure on plunger 25 sufficiently to enable switch 21, 23 to close. Considered conversely a shorter period of heating of bimetallic strip 28 by resistance heating winding 29 being energized will effect opening of switch 21, 23. Consequently, the switch 21, 23 will be closed for a shorter aggregate time than would be the case if the circuit shown in FIGURE 6 were used.

The operation of the switch-modifying mechanism described above will result in the load or contactor circuit 37 being energized for a smaller total period of time than would otherwise be the case and, consequently, less heat is supplied to the medium, the temperature of which is sensed by the control switch mechanism. Because less heat is thus supplied to the medium, its temperature will not be raised so rapidly and, consequently, the possibility of the temperature progressing beyond the selected temperature is reduced. The period of time during which the load or contactor circuit 37 is energized can be observed by illumination of the neon light 50, which is connected in series with the fixed resistance 51 across the load or contactor line 37. The effect of the heating of bimetallic strip 31 on the switch mechanism to adjust the proportion of time that the load or contactor circuit 37 is energized can be regulated by adjustment of the rheostat 40 connected in series with the resistance heating winding 39, as explained in connection with FIGURE 6. If desired, a fuse 52 may be included in one leg of the supply line, as shown.

Figure 8:
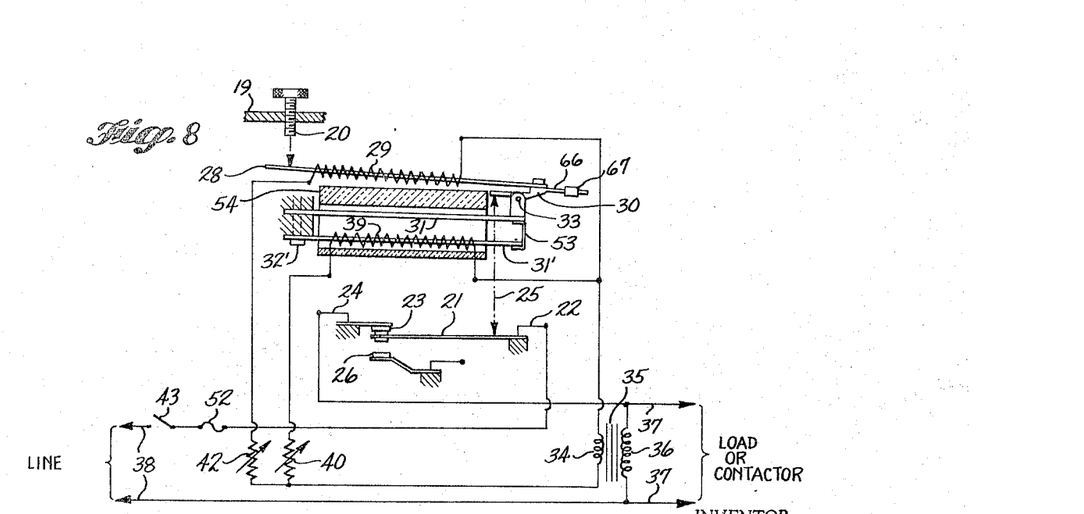

The electric circuit arrangement of FIGURE 8 is similar to that of FIGURE 6, but the modifying mechanism for the switch means is of somewhat different structure than that shown in FIGURE 6. The arm 19, switch-actuator screw 20, bimetallic strip 28, resistance heating winding 29 and power transformer 34, 35, 36 are all the same as in FIGURE 6. In the circuit of resistance heating winding 29, the rheostat 42 is included to enable the heating effectiveness of the winding 29 to be altered, as discussed in connection with FIGURE 7. Also, a fuse 52 and line switch 43 are included in the line 38, as shown in FIGURE 7. Power to the load or contactor output line 37 and the transformer 35 is controlled by the switch 21, 23 actuated by the plunger 25, also as illustrated and described in FIGURE 6.

FIGURE 8 departs from FIGURE 6 in the particular structure of the thermoresponsive means for supporting the fulcrum pivot 33 for the return stub 30 of the compound lever system. Instead of fulcrum pivot being supported simply by a single bimetallic strip 31, as shown in FIGURES 3 to 7 inclusive, a further bimetallic strip 31' parallel to strip 30 is supported in cantilever fashion by the rivet 32' and the free ends of the strips 31 and 31' are connected by a flexible yoke 53. Both strips are arranged so that when heated their free ends move in a direction away from the switch arm 21 so that the pressure on plunger 25 is relieved and the switch 21, 23 tends to close. On the contrary, as the strips 31 and 31' cool, the force on plunger 25 is increased, tending to open the switch 21, 23.

An electrical resistance heating winding 39 is provided for only one of the strips 31, 31' and such winding is shown in FIGURE 8 as being applied to the strip 31'. The strip 31 is spaced far enough from the strip 31' and winding 39 so that this strip also will be heated by the winding 39, but less directly and less effectively because of the distance between such winding and the bimetallic strip. The heat of the winding 39 is conserved, however, by housing the strips 31 and 31' and the winding 39 in the interior of a hollow insulating housing 54. While such insulating housing will confine the heat to which the strips 31 and 31' are subjected so that their cooling will be retarded when the winding 39 is deenergized, it is not intended that the insulation confine the heat very effectively. The heating effectiveness of winding 39 also can be regulated by a rheostat 40 in circuit with it.

The action of the switch-modifying means shown in FIGURE 8 is generally the same as that of FIGURE 6 in that the action of the bimetallic strip 28 will buck or oppose the action of the other two bimetallic strips 31 and 31'. The difference between the actions of these bimetallic strips is that the strip 28 is thin and can be heated quickly and will cool quickly, whereas both bimetallic strips 31 and 31' will be of considerably thicker bimetallic material so that they will be heated more slowly and, particularly because of the effect of the insulation envelope 54, will cool more slowly. Also, because bimetallic strip 31 is spaced from the resistance heating winding 39, such strip will be heated more gradually than the strip 31'.

As the switch 21, 23 opens and closes intermittently because of the action of the bimetallic strip 28, the resistance heating winding 39 also will be energized and deenergized intermittently. Because of the different heating and cooling rates of the strips 31 and 31', the effect on yoke 53 and fulcrum pivot 33 effected by these two strips will be virtually a steady progression away from the switch arm 21 despite the alternate energization and deenergization of winding 39. The heating of strip 31 will be more gradual than the heating of strip 31' and, because of the lower temperature of this strip and the thicker insulation above it, the cooling of this strip also will be more gradual than the cooling of strip 31'. As a result, the periods during which switch 21, 23 is closed will decrease quite uniformly in duration as the selected temperature of the medium is approached. Oscillation or hunting of the temperature of the medium will thus be reduced still farther below the oscillation or hunting which occurs when the control circuit shown in FIGURE 6 is utilized.

The control mechanism shown in FIGURES 9 to 12 inclusive is of a different representative type than that shown in FIGURES 1 and 2, being a mercury switch type of controller. The tube 2 connects the controller to a fluid-filled temperature-sensing bulb 1, such as shown in FIGURE 1. The fluid fills such bulb, tube 2 and an arcuate Bourdon tube 55 connected by a connection 56 to a lever 57 mounted by a pivot 58 on casing 59. Conventionally, a carrier 60 supporting the mercury container 61 is fixed to the lever 57. When this lever is swung by straightening action of the Bourdon tube 55 from the position shown in FIGURE 10 to that of FIGURE 11, the mercury container 61 will be tilted from the position of FIGURE 10 to that of FIGURE 11. Such mercury container is in circuit-closed position in FIGURE 1 in which the mercury forms a short between the ends of switch wires immersed in the mercury. When the container has been tilted into the position shown in FIGURE 11, the mercury flows toward the opposite end of the container and away from the switch wires to interrupt the connection between them.

Figures 9, 10, 11, 12:
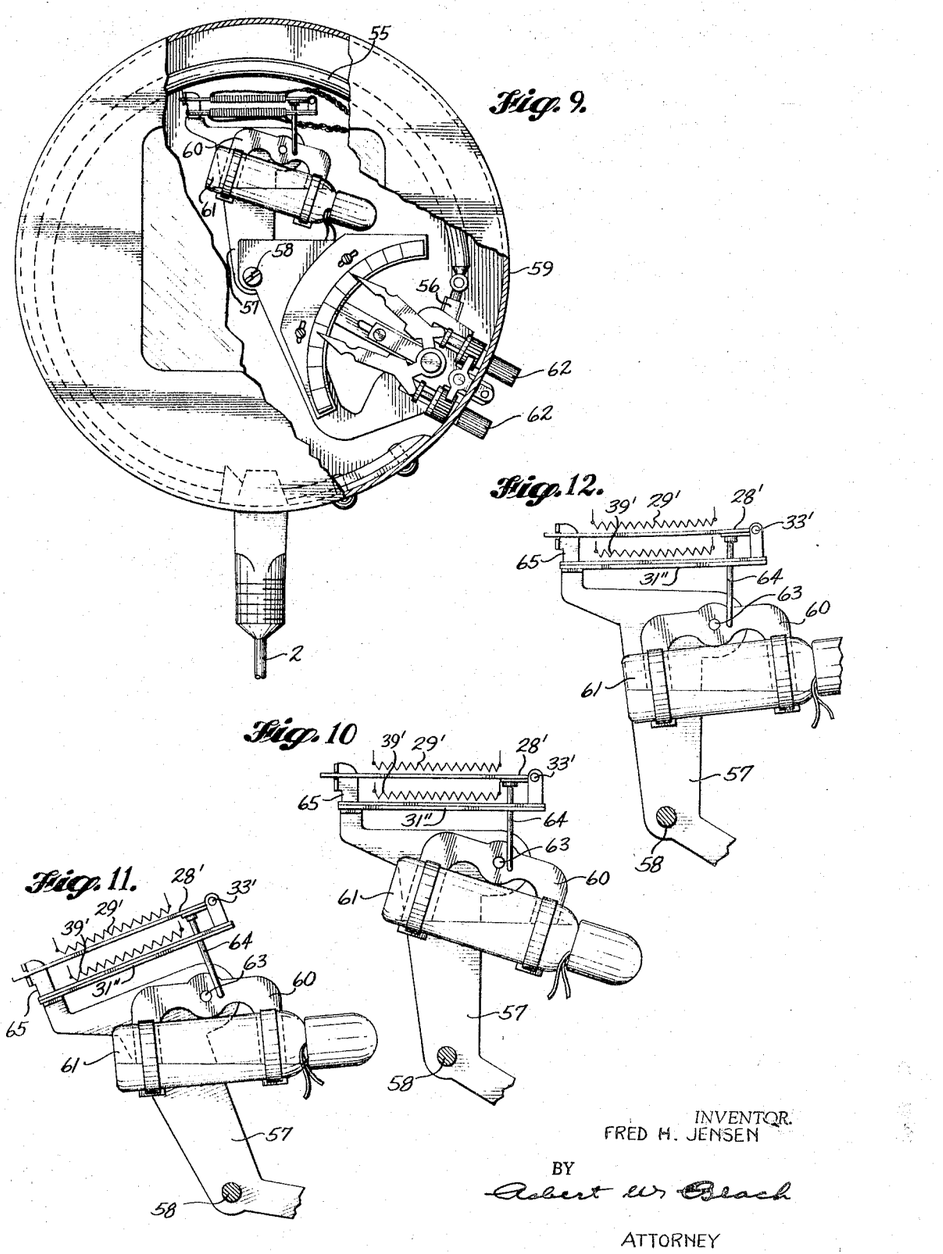
FIGURE 9 is an elevation of a different type of switch mechanism modified in accordance with the present invention and having parts broken away.
FIGURES 10, 11 and 12 are elevations of a subassembly of the switch mechanism shown in FIGURE 9 illustrated in different positions.

The amount of straightening of Bourdon tube 55 required to tilt the switch lever 57 from the position shown in FIGURE 10 to that of FIGURE 11 can be altered by rotation of the adjusting knobs 62 mounted on the casing to alter the connection 56. The controller of the mercury switch type thus far described is conventional. Such switch means can be modified to utilize the principle of the present invention by mounting the mercury container carrier 60 to tilt relative to lever 57 by the pivot 63. The degree of tilt of the carrier relative to the lever can then be altered by connecting thermoresponsive mechanism between the arm 57 and the carrier 60. Such thermoresponsive mechanism will reciprocate the plunger link 64 connected to the carrier 60 at a location offset slightly from the axis of pivot 63.

For this embodiment of the invention, also, the thermoresponsive means may be in the form of bimetallic strips heated by electric resistance heating windings located adjacent to them and which strips are assembled in a compound lever system. The details of such thermoresponsive modifying means for the controller are shown best in FIGURES 10, 11 and 12, although such thermoresponsive means are shown somewhat diagrammatically in these figures. A supporting bimetallic strips 31" has one end anchored to a horn 65 projecting from lever 57. The movable end of strip 31" thus supported in cantilever fashion carries the fulcrum pivot 33' of the compound lever system. On this pivot is mounted the bimetallic strip 28" to which is attached one end of the plunger link 64 at a location spaced a short distance from the fulcrum pivot. The free end of this bimetallic strip fits slidably in a notch in the horn 65.

Like the bimetallic strip 28 of the modifying mechanism described in connection with FIGURES 1 to 8 inclusive, the bimetallic strip 28' is considerably thinner than the bimetallic strip 31". To increase further the strength and stiffness of the bimetallic strip 31", two bimetallic strips can be utilized in face-to-face relationship and these strips can be secured together in a suitable fashion so that they will jointly support the fulcrum pivot 33'. An electric resistance heater winding 29' is mounted adjacent to the bimetallic strip 28', such as by being wound around such strip, and preferably an electric resistance heating winding 39' is provided adjacent to bimetallic strip 31". Such winding can be wrapped around both of the bimetallic strips forming the composite strip 31" and such winding can be utilized to hold such two strips in face-to-face relationship. The plunger link 64 will extend through an aperture in the strip 31" which is sufficiently large so as not to impede bending of strip 31" as a result of being heated by the winding 39' when energized.

The bimetallic strips 28' and 31" are mounted in the apparatus of FIGURES 10, 11 and 12 so that heating of the strip 28' will bend it in concave upward conformation so as to exert force tending to swing the mercury container from the switch-closed position shown in FIGURE 10 to the switch-open position of FIGURE 12. The bimetallic strip 31", on the contrary, is mounted so that heating of it by winding 39' will tend to cause these strips to be bent concavely downward so as to exert a force on the lever system opposing that of bimetallic strip 28' and tending to swing the mercury container from the switch-open position of FIGURE 12 to the switch-closed position of FIGURE 10 relative to lever 57. As the bimetallic strips are heated simultaneously by their respective heating windings, therefore, the forces produced by them will oppose each other. As the temperature of the medium sensed by the controller increases, the lever 57 will be swung from the position shown in FIGURE 10 toward the position shown in FIGURE 11 in which the switch will be open.

It is evident, therefore, that whether the switch is open or closed will depend on both the swung position of lever 57 and the swung position of carrier 60 relative to lever 57. The resistance heating windings 29' and 39' can be connected in a control circuit such as shown in FIGURE 6 so as to modify the action of the conventional controller. The resulting control operation will be similar to that described in connection with FIGURE 6. As the temperature of the medium is heated with the mercury container in the switch-closed position of FIGURE 10, the bimetallic strips 28' and 31" will be bent generally as shown in FIGURE 12 and the lever 57 will be swung farther in a counterclockwise direction. As the temperature of the medium increases, the Bourdon tube 55 will straighten somewhat to swing the lever 57 into the position shown in FIGURE 12.

Tipping of the mercury container into the open-circuit position of FIGURE 12 by such swinging of the lever will deenergize the resistance heating windings 29' and 39' so that the bimetallic strip 28' will cool relatively quickly and the composite bimetallic strip 31" will cool more slowly until a downward force has been produced on the plunger link 64 sufficient to tilt the mercury container into the circuit-closed position of FIGURE 10. Such closing of the circuit will again energize the heating apparatus for heating the medium and simultaneously energize the heating resistance windings 29' and 39'. Such resistance heating will cause the bimetallic strips 28' and 31" to bend farther for exerting an upward force on the plunger link 64 again to swing the mercury container 61 counterclockwise into open-circuit position.

As the heating of the medium continues, lever 57 will be swung farther in a counterclockwise direction toward the position of FIGURE 11 and the mercury switch will be alternately opened and closed intermittently with the length of the open-circuit periods increasing as lever 57 swings farther in a counterclockwise direction and bimetallic strips 28' and 31" are required to cool farther and unbend to lower the plunger link 64 sufficiently to tilt the mercury container 61 again into circuit-closing position. Eventually the switch mechanism will approach or reach the position shown in FIGURE 11 in which the medium has been heated to a temperature sufficiently high as to effect swinging of the lever 57 in a counterclockwise direction so far that the bimetallic strips 28' and 31", when completely cooled, cannot swing the carrier 60 relative to the lever far enough to move the mercury container 61 into circuit-closing position. The switch mechanism will then remain open and the heating apparatus deenergized until the temperature of the medium has dropped sufficiently far to effect swinging of lever 57 clockwise enough to tilt the mercury container 61 into circuit-closing position again.

The switch-modifying means described above is well balanced mechanically and its operation is not appreciably altered by being jolted or by vibration. The weight of the compound lever system is quite equally balanced on opposite of the fulcrum pivot 33. If desired provision may be made for adjusting the balance of the weight at opposite sides of such pivot by providing a rod 66 projecting from the return stub 30, as shown in FIGURE 8, along which a balancing weight 67 can be moved. Such weight can be secured on the rod in a desired adjusted position by a set screw or the rod can be threaded externally to fit an internally threaded bore of the weight which can then be secured in position by a set screw or by a lock nut. Such an adjustable weight can be provided on the compound lever arrangement by FIGURES 3 and 4 and that of FIGURES 9 to 12 inclusive, if desired.

I claim as my invention:

1. Control switch mechanism comprising switch means, and lever means operable to effect movement of said switch means, said lever means including a support, first flexible strip means mounted in cantilever fashion by said support and having a free end portion displaceable relative to said support by flexure of said first flexure strip means, a fulcrum carried by said first flexible strip means at a location remote from said support, second flexible strip means engaged with said fulcrum and tiltable relative thereto, switch-actuating means engaged between said switch means and a portion of said second flexible strip means spaced from said fulcrum for effecting movement of said switch means by movement of said switch-actuating means relative to said support accomplished by movement of said second flexible strip means relative to said support, and temperature-sensing means, responsive to the temperature of an environment and engageable with said lever means, for effecting tilting of said lever means to actuate said switch-actuating means.

2. The control switch mechanism defined in claim 1, in which at least one of the flexible strip means is deformable by altering the temperature thereof, electric heating means for heating said temperature-deformable flexible strip means, and means operable to effect energization of said electric heating means by circuit-closing movement of the switch means to modify the effect of the temperature-sensing means on the lever means in moving the switch-actuating means.

3. The control switch mechanism defined in claim 1, in which the temperature-sensing means includes a movable arm carrying the support, the lever means is mounted for movement bodily with said arm, the switch means is a mercury switch, and the switch-actuating means includes a tiltable lever supporting the mercury switch and operable to tilt the mercury switch relative to said arm by movement of the lever means.

4. The control switch mechanism defined in claim 1, in which the first strip means is of material considerably thicker than the material of the second strip means.

5. The control switch mechanism defined in claim 4, in which the first strip means includes two bimetallic strips disposed in parallel face-to-face interconnected relationship.

6. The control switch mechanism defined in claim 5, in which the two bimetallic strips of the first strip means are in face-to-face contact, and heating means adjacent to the two bimetallic strips for heating them.

7. The control switch mechanism defined in claim 5, in which the two bimetallic strips of the first strip means are spaced apart, and heating means adjacent to one of the two bimetallic strips of the first strip means, the other bimetallic strip of the first strip means being heated indirectly by said heating means.

8. The control switch mechanism defined in claim 7, and insulation means insulating the two bimetallic strips of the first strip means to retard heat dissipation therefrom.

References Cited by the Examiner

UNITED STATES PATENTS

| | | | |
|---|---|---|---|
| 1,928,907 | 10/1933 | Noble | 200—122 |
| 1,942,697 | 1/1934 | Henning | 73—363.5 |
| 2,194,245 | 3/1946 | McGoldrick | 200—122 |
| 2,565,631 | 8/1951 | Sander | 200—113 X |
| 2,748,223 | 5/1956 | Frank | 200—122 |
| 2,877,835 | 3/1959 | Werr et al. | 200—122 X |
| 2,979,597 | 4/1961 | Karlan | 200—122 |
| 2,988,621 | 6/1961 | Cassidy | 200—138 |
| 3,061,697 | 10/1962 | Kralik | 200—88 |

FOREIGN PATENTS

| | | |
|---|---|---|
| 1,077,343 | 3/1960 | Germany. |
| 1,101,644 | 3/1961 | Germany. |

BERNARD A. GILHEANY, *Primary Examiner.*

T. MACBLAIN, L. H. WRIGHT, H. A. LEWITTER,
*Assistant Examiners.*